United States Patent
Wetzel et al.

(10) Patent No.: US 7,086,054 B2
(45) Date of Patent: Aug. 1, 2006

(54) METHOD AND DEVICE FOR RECONSTRUCTING THE PROCESS SEQUENCE OF A CONTROL PROGRAM

(75) Inventors: Gabriel Wetzel, Stuttgart (DE); Jens Fiedler, Thalmassing (DE); Matthieu Falcucci, Oloron (DE)

(73) Assignee: Robert Bosch GmbH, Stuttgart (DE)

( * ) Notice: Subject to any disclaimer, the term of this patent is extended or adjusted under 35 U.S.C. 154(b) by 857 days.

(21) Appl. No.: 10/034,546

(22) Filed: Dec. 28, 2001

(65) Prior Publication Data

US 2002/0152256 A1 Oct. 17, 2002

(30) Foreign Application Priority Data

Dec. 28, 2000 (DE) .......................................... 100 65 498

(51) Int. Cl.
*G06F 9/46* (2006.01)

(52) U.S. Cl. ........................... 718/100; 718/102; 700/1; 700/100; 700/221

(58) Field of Classification Search ................. 718/100, 718/101, 102, 107; 700/1, 83, 99, 100, 115, 700/116, 221
See application file for complete search history.

(56) References Cited

U.S. PATENT DOCUMENTS

| | | | | |
|---|---|---|---|---|
| 5,448,735 A | * | 9/1995 | Anderson et al. | 718/100 |
| 5,530,861 A | * | 6/1996 | Diamant et al. | 705/8 |
| 5,606,695 A | * | 2/1997 | Dworzecki | 705/8 |
| 5,619,409 A | * | 4/1997 | Schultz et al. | 700/17 |
| 5,628,013 A | * | 5/1997 | Anderson et al. | 718/107 |
| 5,826,080 A | * | 10/1998 | Dworzecki | 718/103 |
| 5,828,880 A | * | 10/1998 | Hanko | 718/106 |
| 5,844,795 A | * | 12/1998 | Johnston et al. | 700/83 |
| 5,872,909 A | | 2/1999 | Wilner et al. | |
| 6,272,388 B1 | * | 8/2001 | Buvel et al. | 700/86 |
| 6,304,891 B1 | * | 10/2001 | Anderson et al. | 718/107 |
| 6,415,190 B1 | * | 7/2002 | Colas et al. | 700/79 |
| 6,775,582 B1 | * | 8/2004 | Schaaf et al. | 700/116 |

FOREIGN PATENT DOCUMENTS

DE 195 00 957 1/1996

\* cited by examiner

*Primary Examiner*—Majid Banankhah
(74) *Attorney, Agent, or Firm*—Kenyon & Kenyon

(57) ABSTRACT

A method and a device for reconstructing the sequence of processes of a control program executed by a computing device, in particular a microprocessor, from the contents of a first table and a second table. The control program is subdivided into a plurality of tasks, and each task has at least one process. During execution of the control program, for each completed task, an identifier for a process last executed before the start of the completed task is stored in the first table. The order of the respective completed tasks is stored in the second table. To reliably reconstruct the process sequence, the method and device involve the following. At first, from the contents of the first table and the second table, a third table is generated which contains, for each new task, the identifier for a process last executed before the start of the new task, and the complete process sequence of the control program is then reconstructed from the third table with the knowledge of the process sequence of the individual tasks.

17 Claims, 7 Drawing Sheets

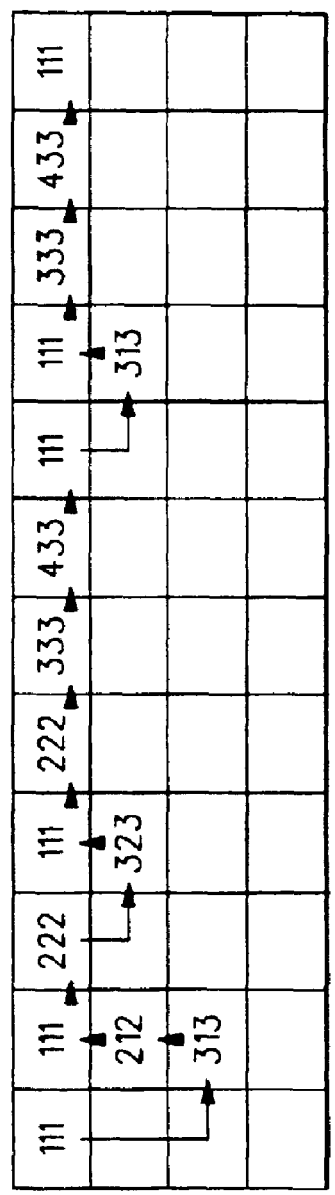

| | 0 | 1 | 2 | 3 | 4 | 5 | 6 | 7 | 8 | 9 | 10 | 11 |
|---|---|---|---|---|---|---|---|---|---|---|---|---|
| | 1 | 1 | 1 | 1 | 1 | 1 | 1 | 1 | 1 | 1 | 1 | 1 |
| | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |

| | |
|---|---|
| 111 | 0 |
| 313 | 1 |
| 212 | 2 |
| 111 | 3 |
| 222 | 4 |
| 323 | 5 |
| 111 | 6 |
| 222 | 7 |
| 333 | 8 |
| 433 | 9 |
| 111 | 10 |
| 313 | 11 |
| 111 | 12 |
| 333 | 13 |
| 433 | 14 |
| 111 | 15 |

Fig. 9

| | | | |
|---|---|---|---|
| 0 | 111 | 323 | 16 |
| 1 | 313 | 333 | 17 |
| 2 | 212 | 413 | 18 |
| 3 | 111 | 423 | 19 |
| 4 | 222 | 433 | 20 |
| 5 | 323 | 111 | 21 |
| 6 | 111 | | |
| 7 | 212 | | |
| 8 | 222 | | |
| 9 | 333 | | |
| 10 | 413 | | |
| 11 | 423 | | |
| 12 | 433 | | |
| 13 | 111 | | |
| 14 | 313 | | |
| 15 | 111 | | |

Fig. 10

METHOD AND DEVICE FOR RECONSTRUCTING THE PROCESS SEQUENCE OF A CONTROL PROGRAM

FIELD OF THE INVENTION

The present invention relates to a method and a device for reconstructing the sequence of processes of a control program executed by a computing device, in particular a microprocessor, from the contents of a first table and a second table. The control program is subdivided into a plurality of tasks, with each task having at least one process. During execution of the control program preceding the reconstruction, an identifier for a respective completed task is stored in the first table for the process last executed before the start of the completed task. The order of the respective completed tasks during execution of the control program is stored in the second table. The present invention also relates to a memory element, in particular a read-only memory, random access memory, or flash memory. A computer program is stored in the memory element and may be run on a computing device, in particular on a microprocessor. The present invention also to a computer program that is capable of being run on a computing device, in particular a microprocessor.

BACKGROUND INFORMATION

A control program may provide, for example, for the control/regulation of technical processes and other functions in a motor vehicle. Such a control program is capable of being run on a computing device, in particular a microprocessor, of a controller of a motor vehicle. The control program is subdivided into a plurality of tasks, with each task having at least one process. Different priorities are assigned to the individual tasks. The control program may be executed in a cooperative or a preemptive mode.

Execution of individual tasks of a control program in the cooperative mode apparatus, arrangement or structure that for tasks having different priorities, a higher priority task to be performed causes an interruption of a lower priority task currently being performed. As compared to the preemptive mode, in which a higher priority task to be performed interrupts a process of a lower priority task currently being performed, in the cooperative mode the higher priority task waits for the process of a lower priority task currently being performed to end. Only then is the lower priority task interrupted and the higher priority task performed. When the higher priority task is completed, the lower priority task is continued in the process before which it was interrupted.

The execution of the task of a control program in the cooperative mode is referred to in German Published Patent Application No. 195 00 957. The interruption of a lower priority task by a higher priority task is part of the function of a multi-tasking operating system. An example of such a multi-tasking operating system, which supports the cooperative mode as well as the preemptive mode in the execution of control programs, is provided by the Real Time Operating System ERCOS® from ETAS Entwicklungs- und Applikationswerkzeuge für elektronische Systeme [Development and Application Tools for Electronic Systems] GmbH & Co. KG, Stuttgart, Germany (see ETAS GmbH & Co. KG: ERCOS® V2.00 manual, Stuttgart, 1998). Reference is expressly made to German Published Patent Application No. 195 00 957 and the ERCOS® manual, which are incorporated by reference.

The run time of the processes varies, depending on the load on the computing device. For this reason, and because of the possible interruptions caused by other higher priority tasks, the sequence of the process requests may be different for multiple executions of the same control program. In other words, the exact sequence of process requests is not known after the control program executes, and cannot be reconstructed for simulation purposes, for example.

It is believed that there are various methods for simulation of a control program or portions thereof (algorithm). Subsequent simulation of an algorithm or of the control program using measured data is designated as offline open loop (OOL) simulation. So-called offline closed loop (OCL) simulation involves simulation of an algorithm or of the control program using a simulation model in a closed simulation loop. The lack of reproducibility of the sequence of executed processes causes significant problems, especially for subsequent simulation of the algorithm using measured data (OOL).

Algorithms controlled by a multi-tasking operating system are may be simulated in an optimum state. That is, the individual tasks of the control program are called in such a way that no interruption occurs.

However, this may have the disadvantage that simulation under actual conditions is not possible.

German Patent No. 100 61 001 refers to a "Method and Control Device for Controlling Technical Processes in a Motor Vehicle", in which a control program may be simulated under actual conditions. The method referred to in German Patent No. 100 61 001 is based on storing the process sequence in the memory of a computing device during the actual execution of the control program.

SUMMARY OF THE INVENTION

An object of an exemplary embodiment and/or exemplary method of the present invention is to fully reproduce the actual process sequence in the simplest manner or at least a simpler manner from the contents of the first table and the second table.

It is believed that this object may be achieved by an exemplary embodiment and/or exemplary method of the present invention, based on the method of the aforementioned type, in which:

from the contents of the first table and the second table, a third table is first created which for a respective new task contains the identifier for a process last executed before the start of the new task, and the complete process sequence of the control program is then reconstructed from the third table with the knowledge of the process sequence of the individual tasks.

Using the exemplary method according to the present invention, after execution of the control program, it is believed that the process sequence may be fully reproduced in a simple manner from the information stored in the first and second tables. It may be particularly significant that during execution of the control program, it is not the identifiers for all executed processes that are stored in the first table, but rather, for a respective completed task, only the identifier for a process last executed before the start of the completed task. Since the measurements for storing the sequence of individual processes are performed at the end of the tasks, the second table receives only information about the end of the individual tasks. Using the exemplary method according to the invention, information about the start of the individual tasks that is missing from the first table may be reconstructed.

The reproduced process sequence may be based on a simulation of the algorithms of the control program.

Thus, it is believed that a particularly realistic simulation of the algorithms may be provided, especially with measured data after an OOL simulation. Based on the reproducibility of the simulated process sequences, the measurements and the simulation results may be compared to one another, which may allow particularly effective troubleshooting of the control program.

The third table stores the complete sequence of the individually executed processes up to the point of an exception. The exception involves a series of several consecutively executed processes of the same task in which, for the series, only the last respective task in the series is stored in the third table. Thus, with knowledge of the process sequence of the individual tasks, the complete process sequence of the control program may be easily reconstructed from the contents of the third table.

According to an exemplary embodiment and/or exemplary method of the present invention, in order to create the third table:

the identifiers for the respective last processes of the tasks stored in the second table are first stored in the third table;

for each identifier, it is checked in the first table whether the corresponding process is the last process of its task, and if the identifier corresponds to the last process of its task, no entry is made in the third table; or if the identifier does not correspond to the last process of its task, the checked identifier for the task that was completed at a position corresponding to the position of the checked identifier in the first table is stored in the third table before the identifier for the first process contained in the first table.

The checked identifier is stored in the third table before the identifier for the first process of a specific task contained in the first table. The first process of the task contained in the table may be the first process of the task. However, the first process of a task may not be stored in the first table at all, since the first process during execution of the control program is never the process last executed before the start of a completed task. In such a case, the checked identifier is then stored in the third table, before the identifier for the first process of the task contained in the first table (for example, the second or third process).

The checked identifier is stored before the identifier for a specific process of the task that was completed at a position corresponding to the position of the checked identifier in the first table. In other words, the checked identifier is stored before the identifier for a specific process of the task that had been completed at the time the checked identifier was stored in memory.

An exemplary embodiment and/or exemplary method of the present invention may be used to determine the identifier for the first process of the task contained in the first table based on the following:

a fourth table being used which, for each task, stores information about whether or not the task has already begun, and the contents of the fourth table being checked for the task that was completed at a position corresponding to the position of the checked identifier in the first table.

In addition, a memory cell may be set for a task in the fourth table as soon as the process of the task that is the first to be interrupted by another task is encountered during reconstruction of the process sequence, and the memory cell for the task may be erased as soon as the last process of the task is encountered during reconstruction of the process sequence.

In another exemplary embodiment and/or exemplary method of the present invention, determining the process of the task that is the first to be interrupted by another task that was completed at the position corresponding to the position of the checked identifier in the first table, involves the following:

a fifth table being used which for the processes stored in the third table stores information about whether the stored processes that are the first to be interrupted by another task are the processes of the corresponding task, and the contents of the fifth table being checked, for the processes preceding the position of the checked identifier in the third table, in order to find whether these processes are the first to be interrupted by another task that was completed at a position corresponding to the position of the checked identifier in the first table.

It is believed to be advantageous to set a memory cell in the fifth table as soon as a process stored in the third table is encountered during reconstruction of the process sequence that is the first process of the corresponding task to be interrupted by another task.

Furthermore, according to another exemplary embodiment of the present invention, reconstructing the complete process sequence involves the following:

the identifiers in the third table being subsequently checked in a direction opposing the process sequence to find whether the process corresponding to the checked task belongs to a task with only one process, or whether the process corresponding to the checked identifier is the first process of the corresponding task to be interrupted by another task;

the identifiers for the checked processes being stored in a direction opposite the process sequence in a one-dimensional seventh table, and if the process corresponding to a checked identifier belongs to a task with only one process, or if the process corresponding to the checked identifier is the first process of the corresponding task to be interrupted by another task, no entry being made in the seventh table, or if the process corresponding to a checked identifier belongs to a task having a plurality of processes, and the process corresponding to the checked identifier is not the process of the corresponding task that is the first to be interrupted by another task, the third table be searched for the identifier of the corresponding task that precedes the checked identifier, starting from the position of the checked identifier in a direction opposite the process sequence, and if at least one process is missing before the process corresponding to the checked identifier, the identifier for at least one missing process being entered in the seventh table before the process corresponding to the checked identifier.

Of particular significance may be the implementation of the exemplary method according to the present invention in the form of a memory element. The memory element stores a computer program which is capable of being run on a computing device, in particular a microprocessor, and which is suitable for performing the exemplary method according to the present invention. Thus, in this case, implementing an exemplary embodiment and/or exemplary method of the present invention includes using a computer program stored in the memory element, so that this memory element provided with the computer program is equally representative of the invention as the exemplary method which the computer program is suited to perform. An electrical memory medium in particular, such as a read-only memory, random access memory, or flash memory, for example, may be used as the memory element.

An exemplary embodiment and/or exemplary method of the present invention further relates to a computer program that is suitable for performing the exemplary method according to the invention when the computer program is run on a computing device, in particular a microprocessor. The computer program may be stored in a memory element, in particular a flash memory.

Based on the exemplary device for reconstructing the sequence of processes of a control program of the aforementioned type, the exemplary device may include an apparatus, arrangement or structure for performing the exemplary method according to the present invention.

BRIEF DESCRIPTION OF THE DRAWINGS

FIG. 5 shows a third table at the beginning of the exemplary method according to the present invention in which the identifiers for the respective last processes of the tasks stored in the second table from FIG. 4 are stored.

FIG. 6 shows the third table from FIG. 5 at the end of the exemplary method according to the present invention in which, for the respective new task, the identifier for a process last executed before the start of the new task is stored.

FIG. 7 shows a fourth table in which during performance of the exemplary method according to the present invention information is stored for each task regarding whether or not the task has already started.

FIG. 9 shows contents of the third table from FIG. 6 at the end of the exemplary method according to the present invention.

FIG. 10 shows a seventh table containing a process sequence of the control program that has been reconstructed from the first table from FIG. 3 and the second table from FIG. 4.

DETAILED DESCRIPTION

Figure 1A:
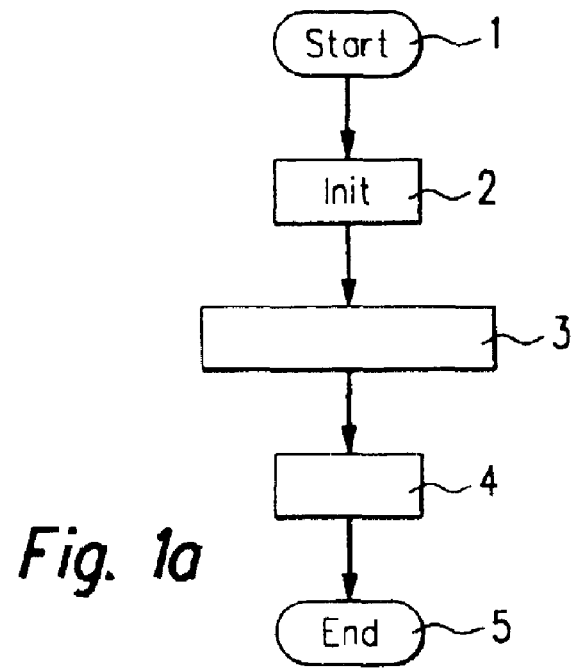
FIG. 1 shows a flow diagram of a method according to the invention.

Control programs for the control of technical processes, especially in a motor vehicle, may be executed on a computing device, in particular a microprocessor. The control programs may be subdivided into a plurality of tasks, with each task in turn having at least one process. A task is called at a specified time, or regularly with a specified sampling time, and may be executed in a cooperative or a preemptive mode. Each task is assigned a specific priority. If two tasks should be performed simultaneously during execution of the control program, the priorities of both tasks are compared and the task with the higher priority is executed first.

If, for example, a task A is being executed and a task B is to be executed, various cases may result, depending on the configuration of the tasks chosen by a programmer:

If task A has a higher priority than task B, performance of task B waits until task A has been completed.

If task B has a higher priority than task A, the execution of task A is interrupted and task B is performed. If the programmer has chosen to perform the tasks in cooperative mode, the performance of task B waits until the end of the current process of task A. As soon as this process has been completed, task A is interrupted and task B is performed. When task B has been completed, task A is further executed at the start of the process before it was interrupted for task B to be performed.

If the programmer has chosen to execute the tasks in preemptive mode, task B interrupts the current process of task A and task B is immediately performed. Task A for the interrupted process is then further executed.

Interruption of a task by another task with a higher priority is one of the functions of a multi-tasking operating system. The run time of the processes varies, depending on the load on the computing device on which the control program is being executed. For this reason, and because of possible interruptions caused by other tasks, the order of process calls may be different for multiple executions of the same control program. Therefore, the order in which the individual processes of the tasks were called is not known after the control program has completed execution.

In another patent application by the applicant of the present patent application, a novel "Method and Control Device for Controlling Technical Processes in a Motor Vehicle" is provided that enables a control program to be simulated under actual conditions. The exemplary method described therein is based on storing the process sequence in the memory of a computing device during the actual execution of the control program. In particular, a unique identifier is assigned to each process before the control program is executed, and, during execution of the control program, to store in memory for a respective completed task only the identifier for a process last executed before the start of the completed task, in a first table ProcMeasArray. The exemplary method for storing the process sequence forms the starting point for the present patent application, and is fully described in the introductory description in the cited patent application, to which reference is made.

The method referred to in German Patent No. 100 61 001 is based on storing the process sequence in the memory of a computing device during the actual execution of the control program.

In this regard, a unique identifier is assigned to each process before the control program is executed, and during execution of the control program to store the identifier for a completed task and, for the completed task, the identifier for a process last executed before the start of the completed task. This may be achieved, for example, by storing the identifiers in two tables, a first table (see FIG. 3) for the identifier for the process last executed before the start of the completed task, and a second table (see FIG. 4) for the completed task. Alternatively, a separate table may be provided for each task, in which the identifiers are stored with an appropriate time stamp. The exemplary method described for storing the process sequence in memory is described in more detail below with reference to FIGS. 2 and 3.

Figures 2, 3, 4:
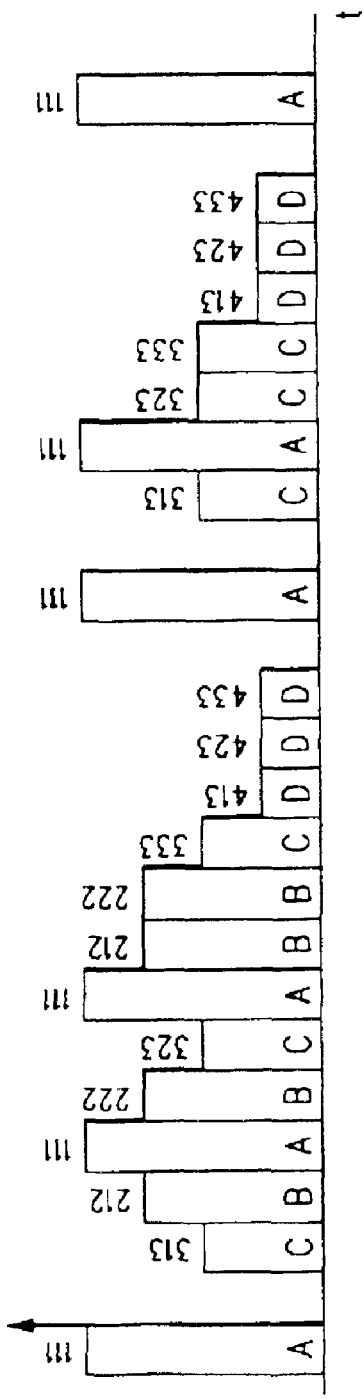
FIG. 2 shows an exemplary process sequence of a control program.
FIG. 3 shows, for the process sequence from FIG. 2, a first table in which the identifier for a process last executed before the start of the completed task is stored for a respective completed task.
FIG. 4 shows, for the process sequence from FIG. 2, a second table in which the order of the respective completed tasks is stored.

FIG. 2 represents the process sequence of a control program. The control program is subdivided into four tasks A, B, C, D. Task A has a process 111, task B has processes 212 and 222, task C has processes 313, 323, and 333, and task D has processes 413, 423, and 433. The individual processes of the tasks are represented as bars in FIG. 2. The highest priority is assigned to task A, and the lowest priority is assigned to task D. The priorities of the tasks are represented by the height of the bars. If the identifier for any one process is stored for the process sequence represented in FIG. 2, all 22 process identifiers must be stored. The contents of the process sequence list are as follows: 111, 313, 212, 111, 222, 323, 111, 212, 222, 333, 413, 423, 433, 111, 313, 111, 323, 333, 413, 423, 433, 111.

To save memory space, for a respective completed task the identifier for the process last executed before the start of a completed task is stored in the first table (see FIG. 3). The first completed task of the process sequence represented in FIG. 2 is task A (process 111). The process last executed before the start of task A is not known. Therefore, the first element of the first table is "xxx."

Next, task C is started (process 313) but not completed. Task B is then started (process 212), but likewise is not completed. The next completed task is thus task A again (process 111). The process last executed before the start of task A is process 212. Therefore, the second element of the first table is "212."

Next, task B is continued (process 222) and completed. The process last executed before the start of task B, and thus before process 212, is process 313. Therefore, the third element of the first table is "313."

Task C is then continued (process 323) but not completed. The next completed task is thus task A again (process 111). The process last executed before the start of task A is process 323. Therefore, the fourth element of the first table is "323."

Next, task B is started (process 212) and also completed (process 222). The process last executed before the start of task B is process 111. Therefore, the fifth element of the first table is "111."

Task C is then completed (process 333). The process last executed before the start of task C, and thus before process 313, is process 111. Therefore, the sixth element of the first table is again "111."

Next, task D is started (process 413) and also completed (process 433). The process last executed before the start of task D, and thus before process 413, is process 333. Therefore, the seventh element of the first table is "333." This exemplary method of storing the process sequence is applied to the entire process sequence represented in FIG. 2, resulting in the first table represented in FIG. 3.

The respective completed task is stored in the second table (see FIG. 4). The first completed task of the process sequence from FIG. 2 is task A. Tasks C and B are then started but not completed. The next completed task is thus task A again. Task B is then continued and also completed. Next, task C is continued but still not completed. The next completed task is thus task A again. Task B is then started again and also completed. Next, task C is resumed and also completed. The method is continued until task A is obtained as the last entry in the second table as the last completed task of the process sequence represented in FIG. 2.

In particular, the subject matter of the present patent application relates to an exemplary method for reconstructing the actual process sequence of the control program from the contents of the first table ProcMeasArray (see FIG. 3). An index variable, a so-called loop index, is entered next to the tables in FIGS. 3 through 10 to better classify the individual elements of the tables.

The exemplary method begins in a function block 1 in FIG. 1a. An initialization step is next performed in a function block 2 in which all values necessary for the exemplary method are initialized, and a second table Task-MeasArray is evaluated (see FIG. 4). A reconstruction algorithm is then executed in a function block 3 to allow the interruptions of tasks A, B, C, D to be reconstructed. The algorithm is based primarily on the evaluation of the first table ProcMeasArray. For each call of a series of at least one process of the same task, the identifier for the process last executed is stored in the third table SimArrayIdent. All processes are then called in the correct order in a function block 4, based on the third table SimArrayIdent. The exemplary method according to the present invention is terminated in a function block 5.

Figure 1B:
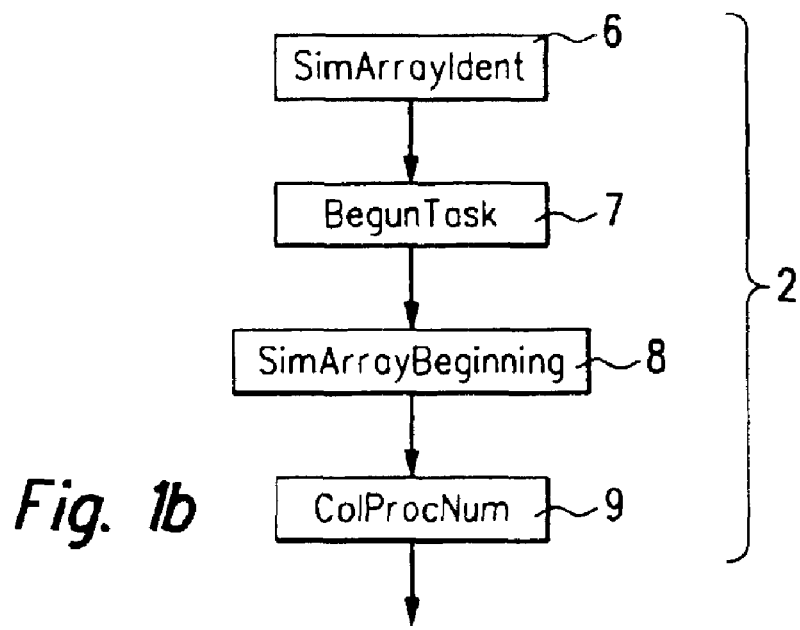

Initialization step 2 is further described with reference to FIG. 1b. A third table SimArrayIdent (see FIG. 5) having the dimensions (number of measured task calls*number of tasks) is initialized in function block 6. The number of measured task calls is the same as for the first table ProcMeasArray, that is, 12. The number of tasks is four (task A, task B, task C, task D). The respective identifier for the last process 111, 222, 333, 433 of each task A, B, C, D stored in the second table TaskMeasArray is stored in the first row of the third table SimArrayIdent. During execution of the control program, the order of the respective completed measuring tasks A, B, C, D for the process sequence from FIG. 2 was previously stored in the second table Task-MeasArray.

A fourth table BegunTask (see FIG. 7) having the dimensions (number of tasks*1) is initialized in a function block 7. During performance of the reconstruction algorithm a memory cell for a task A, B, C, D is set in the fourth table BegunTask as soon as the first process 111; 212; 313; 413 of a task A, B, C, D contained in the first table ProcMeasArray is encountered. The memory cell is cleared for task A, B, C, D as soon as the last process 111; 222; 333; 433 of a task A, B, C, D is encountered. The contents of the fourth table BegunTask are set to zero, since the third table SimArrayIdent initially contains only completed tasks A, B, C, D (the last process 111, 222, 333, 433 of tasks A, B, C, D).

In addition, a fifth table SimArrayBeginning (see FIG. 8) having the dimensions (number of measured task calls*number of tasks) is initialized in a function block 8. If during performance of the reconstruction algorithm the start of a task is found in the third table SimArrayIdent, a corresponding memory cell is set to one at the same position (same row and column) in the fifth table SimArrayBeginning. If during the reconstruction algorithm it is determined by use of the fourth table BegunTask that the task belonging to a measured process stored in the first table ProcMeasArray has already started, the memory cell in the first row of this column of the fifth table SimArrayBeginning is reset. The first row of the fifth table SimArrayBeginning is set to one within the scope of initialization step 2.

A sixth table ColProcNum having the dimensions (number of measured task calls*1) is initialized in a function block 9. During performance of the reconstruction algorithm, for each column the row index of the last memory cell that is not equal to zero in the fifth table SimArrayBeginning is stored in the sixth table.

Figure 1C:
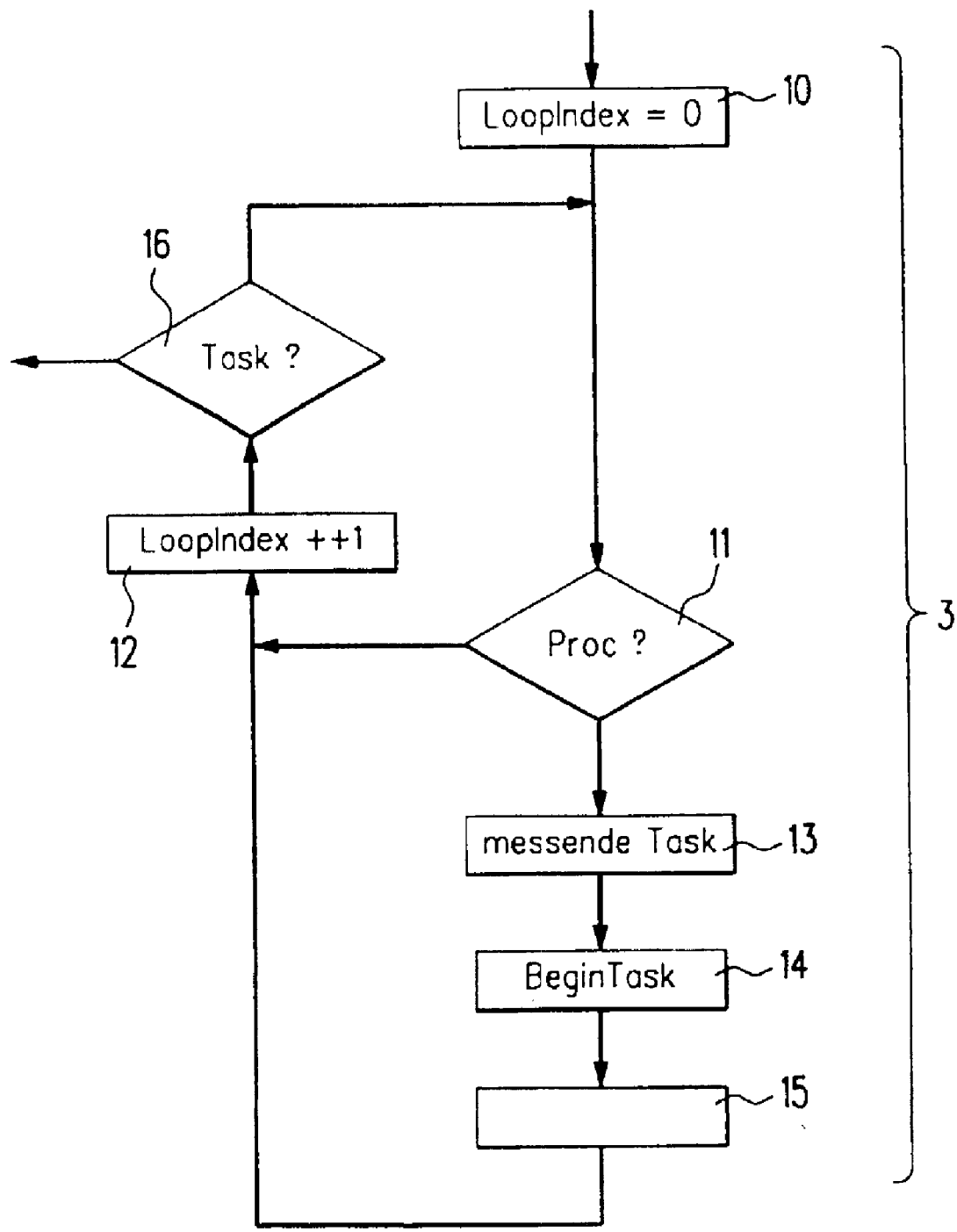

Reconstruction algorithm 3 is described in more detail with reference to FIG. 1c. Each element, that is, each measured process, is checked in succession beginning with the first element of the first table ProcMeasArray. LoopIndex is set to zero (LoopIndex=0) in a function block 10. A query block 11 checks whether process 111 corresponding to the current LoopIndex corresponds to the last process 111 of task A that is assigned to process 111. If this is the case, no entry is made in the third table SimArrayIdent, and branching proceeds to a function block 12, where LoopIndex is incremented by one (LoopIndex=1).

The next process 212 in the first table ProcMeasArray is then checked in query block 11. Since process 212 does not correspond to the last process 222 of task B that is assigned to process 212, branching proceeds to a function block 13, where the measured task corresponding to the current LoopIndex is determined, based on the second table TaskMeasArray (task A). The start, that, is, the first process contained in the first table ProcMeasArray, of the measured task is then determined in a function block 14. The fourth table BegunTask (see FIG. 7), the fifth table SimArrayBeginning, and the sixth table ColProcNum are used to determine the start of the measured task. Of course, the start of the measured task may also be determined in another way.

The determination of the start of the measured task is very simple for task A, since process 111 always represents the start of task A. The current checked process 212 in a function block 15 is then stored in the third table SimArrayIdent before the start of measured task A (see FIG. 6). Finally, a further query block 16 checks whether all processes stored in the first table ProcMeasArray have been checked. If the answer is no, branching proceeds to function block 12, LoopIndex is incremented by one (LoopIndex=2), and the next process of the first table ProcMeasArray is checked. If the answer is yes, branching proceeds in the correct order to call 4 of the process sequence.

Process 313 of the first table ProcMeasArray is checked for LoopIndex=2 in the continuation of reconstruction algorithm 3. It is established in query block 11 that process 313 does not correspond to the last process 333 of task C, which is assigned to process 313. Task B is determined in function block 13 to be the measured task corresponding to the current LoopIndex=2. The start, that is, the first process 212 of measured task B contained in the first table ProcMeasArray, is then determined in function block 14. The current checked process 313 in function block 15 is then stored in the third table SimArrayIdent before the start of measured task B (see FIG. 6). The reconstruction algorithm is continued until the third table SimArrayIdent is obtained with the contents represented in FIG. 6.

Call 4 of all processes in the correct order is described in more detail with reference to FIG. 1d. The processes stored in the third table SimArrayIdent are read from the third table SimArrayIdent in the order denoted by arrows in FIG. 6. A series of processes 111; 212, 222; 313, 323, 333; 413, 423, 433 last executed before the start of a new task A, B, C, D is thus obtained. For a series of a plurality of processes 212, 222; 313, 323, 333; 413, 423, 433 of the same tasks B; C; D, only the respective last process 222; 333; 433 of tasks B; C; D is stored in the third table SimArrayIdent. The missing processes are supplemented in function block 4.

The individual identifiers in the third table SimArrayIdent are checked in a direction opposite to the process sequence, starting with the last identifier. To provide a better understanding, the contents of the third table SimArrayIdent are represented in FIG. 9 in a one-dimensional table with a LoopIndex pointer, shown next to the corresponding table elements, which increases with the process sequence. In a function block 17 the LoopIndex pointer is set at the number of identifiers stored in the third table SimArrayIdent, minus one (LoopIndex=15). The identifier to be checked is selected using the LoopIndex pointer. Next, the identifier for process 111 that corresponds to the checked identifier is stored as the last element in a one-dimensional seventh table (see FIG. 10). A query block 18 checks whether process 111 is assigned to a task having only one process. Process 111 is assigned to task A, which has only one process 111. Branching proceeds to function block 24 in which, starting with the process corresponding to the checked identifier, all processes of the observed task up to the first process of the task before the checked process are entered in the seventh table. In the present case, no additional identifiers for processes are stored in the seventh table. Branching proceeds to a function block 19, where the LoopIndex is decremented by one (LoopIndex=14). A further query block 20 checks whether all identifiers stored in the third table SimArrayIdent have been checked (LoopIndex<0?).

Next, the identifier for process 433 which corresponds to the checked identifier is stored in the seventh table as the next to last element (see FIG. 10). Query block 18 then checks whether process 433 of a task D is assigned to only one process 413, 423, 433. That is not the case, and branching proceeds to a further query block 21 which checks, for the process corresponding to the checked identifier, whether this is the process of the corresponding task that is the first to be interrupted by another task. Based on the fifth table, it is determined that process 433 is the first process to be interrupted by another task. Branching proceeds to function block 24, in which all processes 423, 413 of the observed task D, up to the first process 413 of task D before the checked process 433, are stored in the seventh table, starting with process 433 corresponding to the checked identifier. Branching then proceeds to function block 19, where the LoopIndex is again decremented by one (LoopIndex=13). Query block 20 again checks whether all the identifiers stored in the third table SimArrayIdent have been checked (LoopIndex<0?).

Next, the identifier for process 333 that corresponds to the checked identifier is stored in the seventh table (see FIG. 10). Query block 18 then checks whether process 333 of a task C is assigned to only one process 313, 323, 333. This is not the case, and branching proceeds to a further query block 21 which checks, for process 333 corresponding to the checked identifier, whether this is the process of the corresponding task that is the first to be interrupted by another task.

In this case, however, process 333 is not the first process 313 of task C to be interrupted by another task. Branching therefore proceeds to a function block 22 in which the third table SimArrayIdent is searched, in a direction opposite the process sequence, for a process that precedes the current checked process and, using the fifth table, the first process of task C to be interrupted by another task is determined. Those processes before checked process 333 in a function block 23 that are situated between checked process 333 and process 313 of task C, which is determined in function block 23 as the first to be interrupted by another task, are then entered in the seventh table (see FIG. 10). Thus, in the present case only the identifier for process 323 is entered.

Figure 1D:
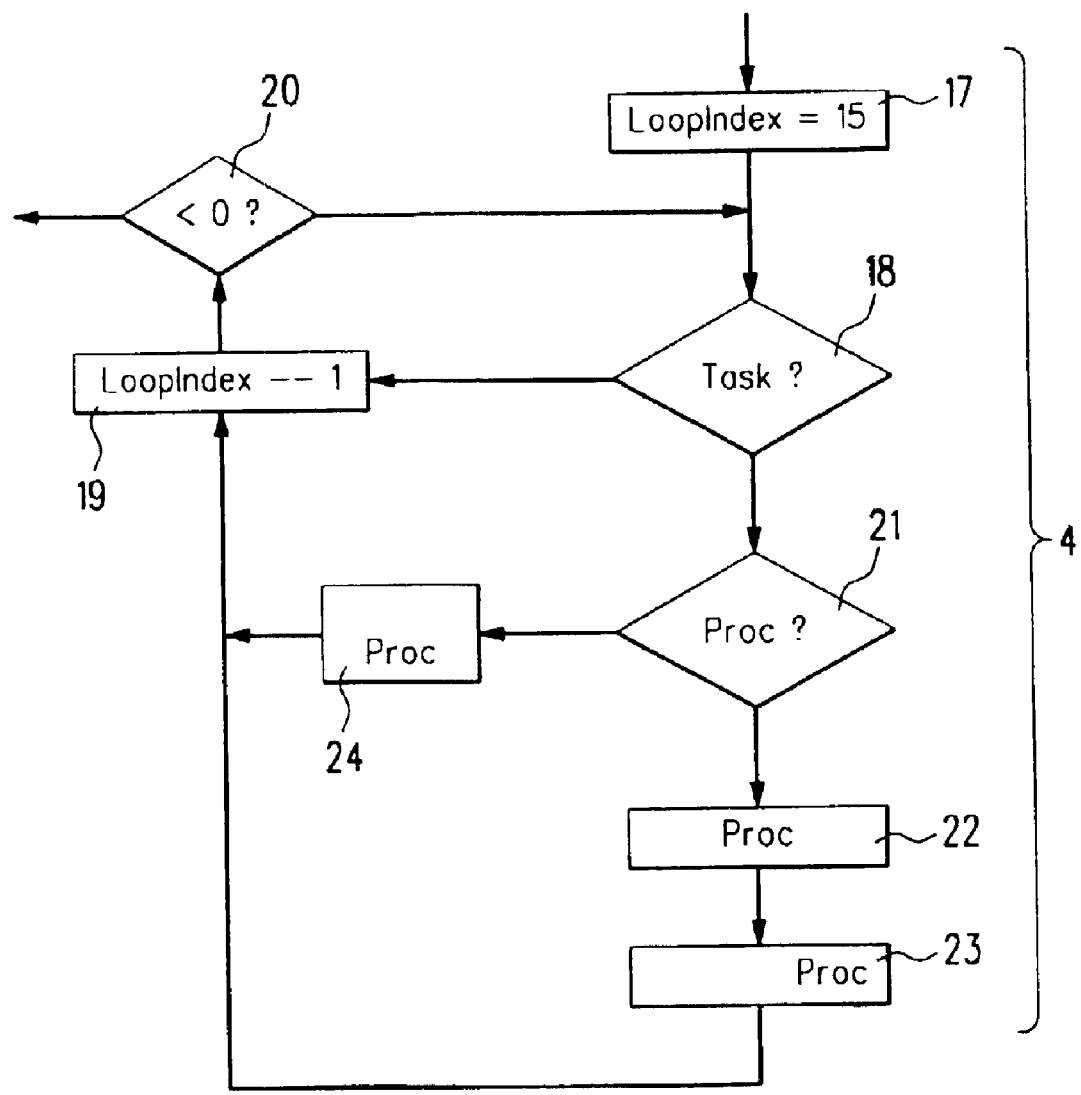

The exemplary method of FIG. 1d is continued until all identifiers stored in the third table SimArrayIdent have been checked (LoopIndex<0 in query block 20). The fully reproduced process sequence of the control program stored in the seventh table is then obtained (see FIG. 10).

Figures 8, 11:
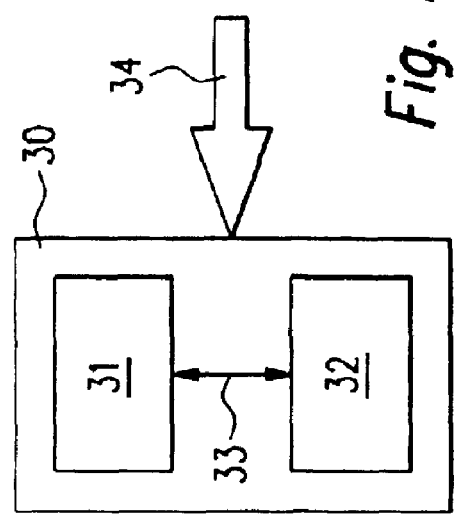
FIG. 8 shows a fifth table in which during performance of the exemplary method according to the present invention information is stored regarding whether the processes stored in the third table are the first processes of the corresponding task.
FIG. 11 shows an exemplary device according to the present invention.

FIG. 11 shows an exemplary device according to the present invention labeled with the reference number 30. Device 30 has a computing device, in particular a microprocessor 31, on which a computer program is capable of being run. In addition, device 30 has a memory element 32 in which the computer program is stored. The computer program, or portions thereof, to be executed by microprocessor 31 is transmitted to microprocessor 31 via a data link 33 that is designed as a bus, for example, and the computer program is executed there. During execution of the computer program, measurement values are fed to microprocessor 31 via suitable interfaces 34 and are processed in microprocessor 31. However, the measurement values may also be stored in memory element 32 and transmitted to microprocessor 31 during execution of the computer program. The measurement values also include, for example, information about the process sequence, in particular the order of execution of the processes of a control program. This information is stored in a first table ProcMeasArray. The exemplary method according to the present invention described above may be performed by executing the computer program on microprocessor 31.

What is claimed is:

1. A method for reconstructing a sequence of processes of a control program executable by one of a computing device from contents of a first table and a second table, the control program being subdivided into a plurality of tasks, each of the plurality of tasks including at least one process, the method comprising:

storing, during execution of the control program and for each completed task, an identifier for one of the at least one process last executed before starting the completed task, in the first table;

storing an order of respective ones of the completed tasks in the second table;

generating at first, from the contents of the first table and the second table, a third table containing, for a new task, the identifier for one of the at least one process last executed before the start of the new task; and reconstructing a complete process sequence of the control program from the third table using the order of execution of the at least one process of the plurality of tasks.

2. The method of claim 1, wherein:

to create the third table, the identifiers for respective last processes of the plurality of tasks stored in the second table are first stored in the third table;

for each identifier in the first table, it is checked whether a corresponding process is the last process of a corresponding one of the plurality of tasks, and if the identifier corresponds to the last process of the corresponding one of the plurality of tasks, no entry is made in the third table, and if the identifier does not correspond to the last process of the corresponding one of the plurality of tasks, a checked identifier is stored in the third table before the identifier for the first process, contained in the first table, of one of the plurality of tasks that was completed at a position corresponding to another position of the checked identifier in the first table.

3. The method of claim 2, wherein to determine the identifier for the first process of the plurality of the tasks, contained in the first table, a fourth table, for each of the plurality of tasks, is operable to store information as to whether a particular task has already begun, and contents of the fourth table are checked for a completed task that was completed at a position corresponding to the another position of the checked identifier in the first table.

4. The method of claim 3, wherein a memory cell is set in the fourth table for one of the plurality of tasks as soon as a particular process of the plurality of tasks that is the first to be interrupted by another task is encountered during reconstruction of the process sequence, and the memory cell is cleared as soon as the last process of the plurality of tasks is encountered during reconstruction of the process sequence.

5. The method of claim 2, wherein, determining the first process, interrupted by another one of the plurality of tasks, of the plurality of tasks that was completed at the position corresponding to the position of the checked identifier in the first table, includes:

using a fifth table to store information as to whether processes stored in the third table are the first processes of corresponding ones of the plurality of tasks interrupted by another one of the plurality of tasks, and checking contents of the fifth, for processes preceding the position of the checked identifier in the third table, to find whether these processes are the first processes, interrupted by another one of the plurality of tasks, of a completed task that was completed at a position corresponding to the position of the checked identifier in the first table.

6. The method of claim 5, wherein a memory cell is set in the fifth table as soon as, during reconstruction of the process sequence, a particular process stored in the third table is encountered that is the first process of a corresponding one of the plurality of tasks to be interrupted by another one of the plurality of tasks.

7. The method of claim 1, wherein the reconstructing of the complete process sequence includes:

checking the identifiers in the third table in a direction opposing the process sequence to determine one of whether the process corresponding to a checked identifier belongs to one of the plurality of tasks having only one process, and whether the process corresponding to the checked identifier is the first process of the corresponding task contained in the first table; and storing the identifiers for checked processes in a direction opposite a process sequence in a one-dimensional seventh table, and one of:

if one of a process corresponding to the checked identifier belongs to a task having only one process, and the process corresponding to the checked identifier is the first process of the corresponding one of the plurality of tasks to be interrupted by another one of the plurality of tasks, no entry is made in the seventh table, and if a process corresponding to the checked identifier belongs to a task having a plurality of processes, and the process corresponding to the checked identifier is not the process of the corresponding one of the plurality of tasks that is the first to be interrupted by another one of the plurality of tasks, the third table searched for the identifier for the process of the corresponding task that precedes the checked identifier, starting from the position of the checked identifier in a direction opposite the process sequence, and if at least one process is missing before the process corresponding to the checked identifier, the identifier for the at least one missing process is entered in the seventh table before the process corresponding to the checked identifier.

8. A memory element storing a computer program executable on a computing device to perform a method for reconstructing a sequence of processes of a control program executable by one of a computing device from contents of a first table and a second table, the control program being subdivided into a plurality of tasks, each of the plurality of tasks including at least one process, the method including:

storing, during execution of the control program and for each completed task, an identifier for one of the at least one process last executed before starting the completed task, in the first table;

storing an order of respective ones of the completed tasks in the second table;

generating at first, from the contents of the first table and the second table, a third table containing, for a new task, the identifier for one of the at least one process last executed before the start of the new task; and reconstructing a complete process sequence of the control program from the third table using the order of execution of the at least one process of the plurality of tasks.

9. A computer program executable on a computing device to perform a method for reconstructing a sequence of processes of a control program executable by one of a computing device from contents of a first table and a second table, the control program being subdivided into a plurality of tasks, each of the plurality of tasks including at least one process, the method including:

storing, during execution of the control program and for each completed task, an identifier for one of the at least one process last executed before starting the completed task, in the first table;

storing an order of respective ones of the completed tasks in the second table;

generating at first, from the contents of the first table and the second table, a third table containing, for a new task, the identifier for one of the at least one process last executed before the start of the new task; and reconstructing a complete process sequence of the control program from the third table using the order of execution of the at least one process of the plurality of tasks.

10. The computer program of claim 9, wherein the computer program is stored in a memory element.

11. A device for reconstructing a sequence of processes of a control program executable by one of a computing device from contents of a first table and a second table, the control program being subdivided into a plurality of tasks, each of the plurality of tasks including at least one process, the device comprising:

a first storing arrangement to store, during execution of the control program and for each completed task, an identifier for one of the at least one process last executed before starting the completed task, in the first table;

a second storing arrangement to store an order of respective ones of the completed tasks in the second table;

a generating arrangement to generate at first, from the contents of the first table and the second table, a third table containing, for a new task, the identifier for one of the at least one process last executed before the start of the new task; and a reconstructing arrangement to reconstruct a complete process sequence of the control program from the third table using the order of execution of the at least one process of the plurality of tasks.

12. The method of claim 11, wherein the computing device includes a microprocessor.

13. The device of claim 1, wherein the computing device includes a microprocessor.

14. The memory element of claim 8, wherein the computing device includes a microprocessor.

15. The memory element of claim 8, wherein the memory element includes a flash memory.

16. The computer program of claim 9, wherein the computing device includes a microprocessor.

17. The computer program of claim 9, wherein the memory element includes a flash memory.

* * * * *